United States Patent [19]

Rahm

[11] Patent Number: 4,708,210

[45] Date of Patent: Nov. 24, 1987

[54] PNEUMATIC ROTARY TOOL

[75] Inventor: Erik R. Rahm, UpplandsVäsby, Sweden

[73] Assignee: Atlas Copco Aktiebolag, Nacka, Sweden

[21] Appl. No.: 817,176

[22] Filed: Jan. 9, 1986

Related U.S. Application Data

[63] Continuation of Ser. No. 712,343, Mar. 15, 1985, abandoned.

[30] Foreign Application Priority Data

Mar. 20, 1984 [SE] Sweden ............................... 8401528

[51] Int. Cl.[4] ............................................. B23B 45/04

[52] U.S. Cl. ..................................... 173/169; 173/170

[58] Field of Search ..................... 173/12, 15, 18, 169, 173/170, 153; 81/57.11, 57.12, 57.13, 57.14, 470; 408/9, 124, DIG. 702; 418/32, 259, 266, 268, 270; 415/503; 137/876, 862, 887

[56] References Cited

U.S. PATENT DOCUMENTS

| | | | |
|---|---|---|---|
| 689,516 | 12/1901 | Rattek | 173/153 |
| 872,417 | 12/1907 | Hellman et al. | 173/153 |
| 2,924,114 | 2/1960 | Hitt et al. | 81/470 X |
| 2,964,151 | 12/1960 | Eckman | 173/12 X |
| 3,298,284 | 1/1967 | Alexander | 173/170 X |
| 3,502,158 | 3/1970 | Rahm | 173/169 |
| 3,811,513 | 5/1974 | Wezel et al. | 173/12 |
| 3,951,217 | 4/1976 | Wallace et al. | 173/169 |

OTHER PUBLICATIONS

Spare Parts List from Atlas Copco for LUM 24 HR (1984-02).

*Primary Examiner*—Paul A. Bell
*Assistant Examiner*—James L. Wolfe
*Attorney, Agent, or Firm*—Frishauf, Holtz, Goodman & Woodward

[57] ABSTRACT

In a pneumatic screw driver including a reversible vane motor (11) a rotatable directional valve (30) is located at the rear end wall (13) of the motor (11) and arranged to distribute motive pressure air to two alternative air inlet ports (22, 23) of the motor (11). The directional valve (30) includes a valve element (31) which comprises a first portion (32) and a second portion (36). The first portion (32) has a plane contact surface for sealing cooperation with the motor end wall (13) and separates the exhaust air venting passage (25) from the air supply passage (19, 34, 35). The second portion (36) is cylindrical and carries two axially spaced seal rings (39, 40) between which there is mounted a radial coupling pin (44) connecting the valve element (31) to a manoeuver ring (47) rotatably supported on the outside of the housing (10).

2 Claims, 4 Drawing Figures

PNEUMATIC ROTARY TOOL

This application is a continuation of application Ser. No. 712,343, filed Mar. 15, 1985, now abandoned.

This invention relates to a pneumatic rotary tool of the type comprising a reversible vane motor supported in the tool housing and rotating an output spindle, a pressure air supply passage in the housing communicating selectively with two alternative air inlet parts on the motor, an exhaust air venting passage in the housing communicating with exhaust port means on the motor, and a manually operable directional valve located in said air supply passage. The valve comprises a valve element which is rotatably shiftable by a limited in a plane transverse to the motor axis between a "forward" position and a "reverse" position.

The main object of the present invention is to accomplish an improved direction valve which enables a simple arrangement of the pressure air supply passage and the exhaust air venting passage in the housing.

Further objects and advantages will appear from the following detailed description of a preferred embodiment of the invention.

Figure 1:
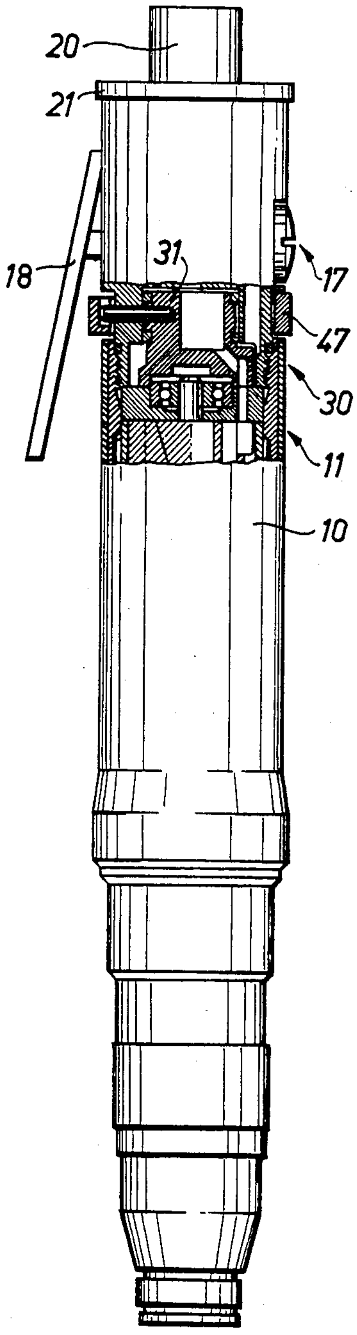
FIG. 1 shows a side view partly in section of a pneumatic rotary tool according to the invention.
Figure 2:
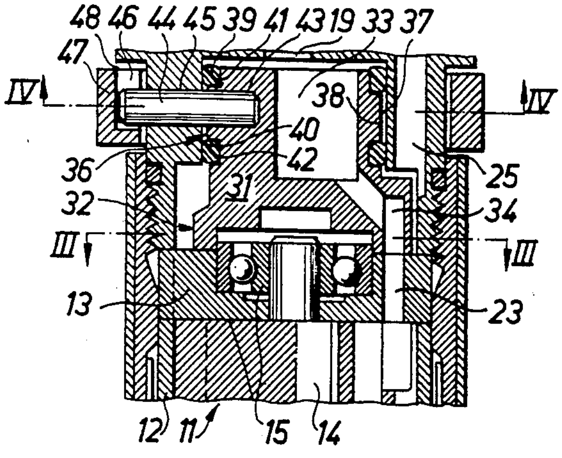
FIG. 2 shows, on a larger scale, a fractional section of the tool in FIG. 1.

The tool shown in the drawing figures is a pneumatic screw driver of the straight type in which the outer cylindrical surface of the housing forms a grip means for manual support and control of the tool.

The tool housing is designated 10 and supports a vane motor 11 comprising a cylinder 12, a rear end wall 13, and a rotor 14 journalled in a bearing 15 in the rear end wall 13. In the housing 10 there is a throttle valve 17 (not shown in detail) controlled by a lever 18 and controlling the pressure air supply to the motor 11 through an air supply passage 19. The latter extends from a conduit connection 20 located on the rear end wall 21 of the housing 10 to two alternative air inlet ports 22, 23 (see FIG. 3) in the motor end wall 13. An exhaust air venting passage 25 communicates exhaust air from an outlet port 26 in the rear motor end wall 13 to an outlet opening (not shown) in the rear end wall 21 of the housing 10. As illustrated in FIG. 4, the exhaust air venting passage 25 is divided into three parallel bores extending through the rear part of the housing 10.

At the rear end of the motor 11, there is a directional valve 30 by which the direction of rotation of the motor 11 is selected. The valve 30 comprises a hollow valve element 32 which forms part of the air supply passage 19 and which is rotatively supported in the housing 10 for limited rotation in a plane transverse to the axis of motor 11. Thus, the valve element 31 is shiftable between a "forward" position and a "reverse" position.

The valve element 31 comprises a first portion 32 which is closest to the motor 11 and which is formed with two laterally located feed passages 34, 35 for alternative communication with the inlet ports 22, 23 of the motor. This first portion 32 has a plane end surface for sealing contact with the motor end wall 13 and serves as a partition means separating the exhaust air venting passage 25 on its outside from the air supply passage 19 extending through it.

Figure 3:
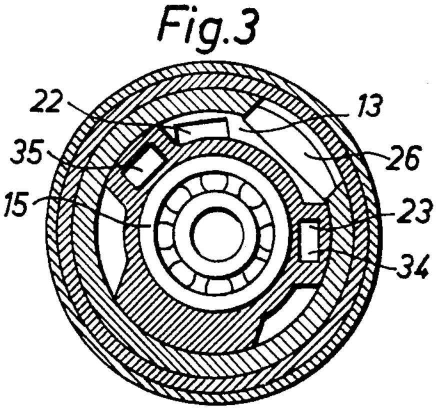
FIG. 3 shows a cross section along line III—III in FIG. 2.
Figure 4:
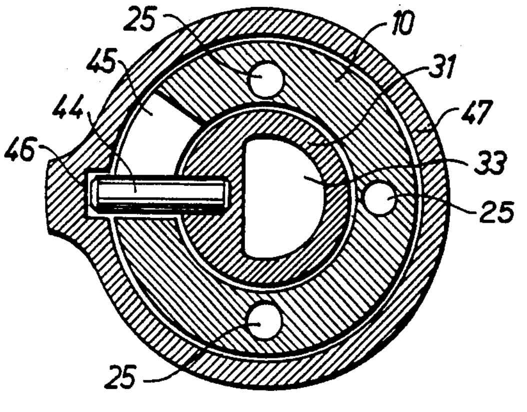
FIG. 4 shows a cross section along line IV—IV in FIG. 2.

In FIG. 3 the valve element 31 is illustrated in its "forward" position, which means that feed passage 34 registers with inlet port 23 whereas port 22 not only is out of register with feed passage 35 but is uncovered by the valve element 31. This means that pressure air is supplied to the motor 22 through port 23 and that port 22 serves as a secondary exhaust port. Thereby, the motor 11 rotates in its main direction. In its "reverse" position the valve element 31 brings feed passage 35 into alignment with port 22, thereby making the motor 22 rotate in the opposite direction. Now, port 23 serves as a secondary exhaust port.

The valve element 31 further comprises a second portion 36 which is tubular in shape and having an outer cylindrical surface 38 which guidingly cooperates with a cylindrical surface 37 in the housing 10. A central passage 33 in the second portion 36 forms a part of the air supply passage 19 and communicates with the feed passages 34, 35. Two seal rings 39, 40 mounted in two axially spaced annular grooves 41, 42 cooperate sealingly with the surface 37 in the housing.

Between the two seal rings 39, 40 the valve element 31 is provided with a radial bore 43 in which a pin 44 is received. The pin 44 extends radially out of the housing 10 through a segment shaped opening 45 and engages in a manoeuver ring 47 which is rotatively supported in a peripheral groove 48 on the outside of the housing 10. Thus, the pin 44 serves as a coupling means between the manoeuver ring 47 and the valve element 31, thereby transferring to the latter the rotational movement imposed on the manoeuver ring 47 when the direction of rotation of the motor 11 is to be changed.

By locating the coupling pin 44 between the two axially spaced seal rings 39, 40 it is ensured that no air leakage along the pin 44 takes place, neither motive pressure air from the supply passage 19 nor exhaust air from the venting passage 25.

By the novel directional valve design defined in the claims it is possible to arrange in a very simple way the air supply passage and the exhaust air venting passage in parallel through the housing. The new valve design also brings the advantage of a relatively large volume of the exhaust air venting passage as the latter surrounds the forward portion of the valve element. This large volume may very well serve as an expansion chamber for reducing the noise of the exhaust air.

I claim:

1. A pneumatic rotary tool, comprising a housing having a cylindrical section, a reversible vane motor supported in the housing and rotating an output spindle, a pressure air supply passage in the cylindrical section of the housing communicating selectively with two alternative air inlet ports in a rear end wall of said motor, an exhaust air venting passage extending through the cylindrical section of the housing and communicating with an exhaust port means on said motor, a manually operable directional valve comprising a valve element which is rotatably supported in the cylindrical section of the housing so as to be shiftable by rotation in a plane transverse to the rotation axis of said motor between a "forward" position and a "reverse" position, a passage means extending substantially axially through said valve element to form a part of said pressure air supply passage, thereby connecting the latter to either of said air inlet ports as said valve element is shifted between said "forward" position and said "reverse"

position, said valve element comprising a first portion which has a non-circular cross section and which is arranged to cooperate sealingly with said vane motor end wall, and a second portion having a circular cross section and being arranged to cooperate sealingly with the cylindrical section of the housing and to form a bearing means for rotatively supporting said valve element in the housing, said first portion of said valve element extending through a part of and being surrounded by said exhaust air venting passage and forming in said part of the exhaust air venting passage a partition means between said exhaust air venting passage and said pressure air supply passage.

2. Tool according to claim 1, wherein said passage means of said valve element is divided into two separate feed passages which at their downstream ends are selectively connectable to said inlet ports in said vane motor end wall.

* * * * *